Patented Mar. 22, 1932

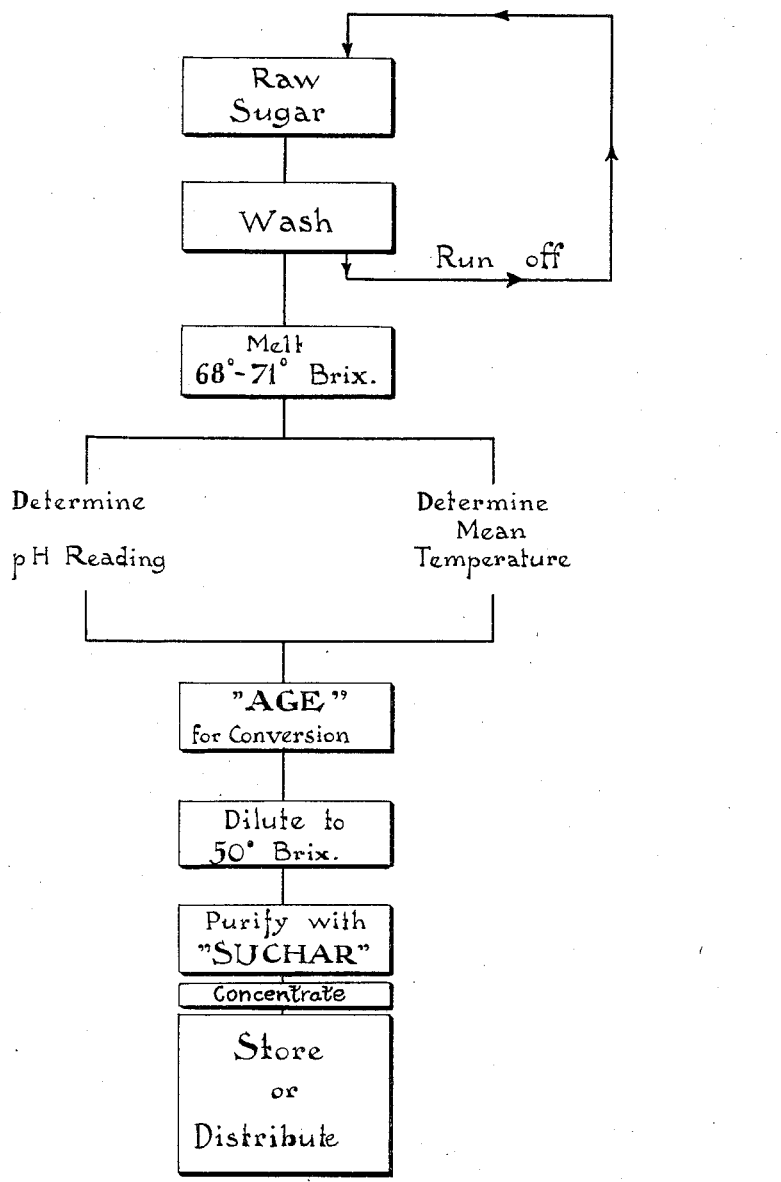

1,850,427

UNITED STATES PATENT OFFICE

DANIEL V. WADSWORTH AND LEONARD WICKENDEN, OF MANHASSET, NEW YORK, ASSIGNORS TO JOHN J. NAUGLE, OF GREENWICH, CONNECTICUT

METHOD OF PREPARING AND HANDLING SUGAR SIRUPS CONTAINING INVERT SUGARS

Application filed July 3, 1929. Serial No. 375,665.

Our present invention relates to methods of preparing and handling sugar sirups containing predetermined percentages of invert sugars, and aims to devise methods of the general character specified which are simple, which may be easily and conveniently practised, and which are capable of producing a high yield of a high grade sugar sirup containing a predetermined proportion of invert sugars. Other objects and advantages of the methods of the present invention will in part be pointed out in detail hereinafter and will in part be obvious to those skilled in the art to which the present invention relates.

In the accompanying specification we shall describe, and in the annexed drawing more or less diagrammatically exemplify, several illustrative embodiments of the methods of the present invention. It is, however, to be clearly understood that our invention is not limited to the specific embodiments thereof herein described and more or less diagrammatically exemplified for purposes of illustration only.

Referring to the drawing, wherein we have more or less diagrammatically exemplified the aforesaid illustrative embodiments of the methods of the present invention:

The single figure of the drawing is a diagrammatic or schematic chart indicating the various steps which may be utilized in practising one or more of the aforesaid illustrative embodiments of the methods of the present invention.

For our starting material we may use any of the well-known grades of raw sugars, such as Cuban, Haitian, Porto Rican, Hawaiian or Philippine cane raws. These sugars may be of average purity, for example, testing about 96 degrees polarization.

While the sugars constituting the raw or starting material for the methods of the present invention may be used in the unwashed condition, we prefer, ordinarily, although this step of the process is optional, to wash the raw sugars at their source or origin. This is for the reason that such washing may ordinarily be more economically conducted at their source or origin than at their ultimate destination. The washing of the raw sugars raises their purity to about 98 or 99 degrees polarization, the exact purity depending to a great extent on the original purity of the raw sugars being treated. The run-offs from the washing operation or operations may be returned to the raw sugar process for re-conversion into raw sugar.

The washed raw sugars thus obtained, or, in the case where the raw sugars are not washed, the original raw sugars in their unwashed condition, are now "melted" or dissolved in water. For the purposes of the present invention we prefer that a sirup of as high a density as is conveniently obtainable should be prepared by the "melting" or dissolving operation. For example, the "melting" or dissolving operation may result in a sirup having a density of from about 68 to about 71 degrees Brix. In certain cases, however, we may prepare a sirup of even higher density, especially where the same is made to contain a substantial percentage of invert sugars, without danger of the sugar crystallizing out of the sirup. In this latter case the sirup obtained may have a density of from about 72 to about 79 degrees Brix.

It may here be stated that while the conversion of the sucrose sirup thus obtained into a sirup containing a substantial percentage of invert sugars may take place during the "aging" period subsequently described, some of this conversion, in fact, if so desired, the greater part of the same, may take place during a preliminary inversion treatment, as with an acid or some suitable invertase preparation, before the "aging" process, now to be described, commences.

We now take the sirup obtained as above described either from washed raw sugars or from unwashed raw sugars and with or without the preliminary inversion treatment just described, and determine its approximate pH or hydrogen-ion concentration. Having approximately determined such pH or hydrogen ion concentration, we modify or control the same so that the same will have a pH or hydrogen ion concentration corresponding to the degree of acidity which we desire. Ordinarily we desire a pH or hydrogen ion concentration which would correspond to a moderate degree of acidity which is ncessary for the "aging" process, corresponding to formation of an initial or additional amount of invert sugars during such "aging" process, which is to be carried out. Ordinarily, a pH reading of between about 4.5 and about 6.5, which latter figure corresponds to substantial neutrality, will be found suitable. However, if the "aging" period is to be shortened, the hydrogen ion concentration should be increased and thus the pH reading diminished. Conversely, if the "aging" period is to be lengthened, the hydrogen ion concentration should be diminished and thus the pH reading increased.

The exact pH reading or hydrogen ion concentration to be selected will depend not only on the desired "aging" period, but will also depend on the mean or average temperature to which the sirup will be subjected during the "aging" process. Accordingly, there should be an at least approximate determination of the mean temperature to which the sirup will be subjected during the "aging" process, since, if the mean temperature is to be higher, for a given period of "aging", the hydrogen ion concentration should be lower, corresponding to a higher pH reading, to yield the same end product containing the desired percentage of invert sugars. Conversely, if the mean temperature is to be lower, for a given period of "aging", the hydrogen ion concentration should be higher, corresponding to a lower pH reading, to yield the same end product containing the desired percentage of invert sugars.

The proper hydrogen ion concentration, corresponding to a particular pH reading, having been determined, and the mean temperature to which the sirup will be subjected during the "aging" process having also been approximately determined, the sirup is now left in such condition as to acidity and mean temperature for a given period of time, sufficient by the process of conversion, under the acidity and temperature conditions which have been thus predetermined, to produce the desired percentage of invert sugars by inversion. Any suitable container may be used for this purpose to permit the "aging" to take place.

It is one of the important features and characteristics of the methods of the present invention that the "aging" process may continue or take place in transit, that is, while the sirups obtained as above described and the acidity and mean temperature characteristics of which have been determined as above described, are being transported, either in tank cars by rail, or in tank steamers by water, to their ultimate destination where the same are to be purified and distributed for actual use. The distance of the point or port of destination from the point or port of shipment being known and the approximate time of shipment being known, and also the approximate mean temperature conditions of the shipment being known, the various factors referred to above may be predetermined with sufficient accuracy to ensure, at the time of arrival of the sirups at the point or port of destination, of a predetermined invert sugar content in the sirups so obtained.

We now subject the sirups, after the "aging" process is completed, whether during a stationary treatment or a treatment in transit, to a suitable purifying operation or series of operations calculated to clarify and lighten such sirups. It is highly desirable, if the sirups made in accordance with the methods of the present invention are to have their maximum market value, that the same shall be substantially white, in fact, as nearly water white as possible, and shall also be free from undesirable taste and odor. The manufacture of such sirups directly from the "melted" or dissolved washed or unwashed raws permits numerous economies to be effected. These economies are increased by the retention of the invert sugars in predetermined proportions.

The desired purification may be effected by any suitable purifying treatment, but preferably by a purifying treatment with a vegetable decolorizing carbon, such as the vegetable decolorizing carbon known to the trade as "Suchar". The decolorizing carbon "Suchar" is fully described and is claimed in a patent issued February 5, 1929, to John J. Naugle, No. 1,701,272, entitled "Electric furnace product." By treating the sirups, preferably diluted down to about fifty degrees Brix and preferably heated to a point short of the boiling point, with, say, about two per cent. of "Suchar" carbon based on the weight of the sugar solids contained in the sirups being treated, after which the sirups, with the "Suchar" in suspension therein, are filtered, and then repeating the treatment, if so desired, with an equivalent amount of "Suchar" a second time, if needs be, a nearly white or substantially water white sirup, free from undesirable taste, odor and color, and of a sparkling clarity, is readily obtained.

This sirup may now be concentrated back to its original or any other suitable density, as to about 66 or 67 degrees Brix in the manner which will be readily known to those skilled in the art to which the present invention relates, and may thereafter be distributed in tank cars or tank trucks directly to the places where it is to be used, thus further economizing in the values rendered possible by means of the methods of the present invention. Or, if desired, the sirup may be stored until desired to be used. If the sirup, which has been subjected to the "aging" process, is obtained by "melting" or dissolving unwashed raw sugars, it is ordinarily necessary that the same be subjected to a crystallizing process by which the raw sugar is crystallized out, washed, then "remelted" and subjected to one or more treatments with "Suchar" or other decolorizing carbon, the mother liquor and the run-offs being at the same time treated with "Suchar" or equivalent decolorizing carbon in a higher percentage, as about ten per cent. of the weight of the sugar solids contained therein, once or more times, and the clarified and purified run-offs and mother liquors added to the purified melt.

This completes the description of the aforesaid illustrative embodiments of the methods of the present invention. It will be noted that such embodiments are simple to practise and result in the superior sirup products described above. By reason of the operations described above the sugar sirups will be found to contain the desired proportion of invert sugars, ordinarily from about two to about five per cent. of the amount of sugar solids contained in the final sirups, although this amount may be either greater or less, depending on particular conditions.

The final sirup will be found to contain, in addition to the sucrose dissolved therein, the predetermined percentage of invert sugars consisting essentially of dextrose and levulose. The sirups will be free from undesirable color, taste and odor, being substantially white or nearly water white and being of a sparking clarity. Due to the fact that the sirup is handled as such in a liquid condition, numerous economies are rendered possible in handling which would not be possible if the sugars were handled in a solid condition. Additional economies are rendered possible by reason of the following considerations:

Since the sirups are made directly from raw sugars they have the advantage of a relatively cheap source of supply of raw material. The sugar values being preferably handled, after the initial "melting" or dissolving operation, in a liquid condition, numerous advantages and economies are rendered possible. Furthermore, the transportation of such sirups during the "aging" process, if the same are being transported during such "aging" process, is easy, convenient and economical since it costs less to transport the same in a tank car or tank steamer full of liquids than it would an equivalent volume or approximately equal volume of solids by the usual methods of transportation. The fire hazards are less and danger of damage to cargo less in the case of liquid sirups. Furthermore, the ultimate purification of such sirups at the point or port of destination is rendered highly convenient by reason of the liquid condition of the sugar values being treated.

Other superiorities and advantages of the methods of the present invention and of the resulting products, particularly as exemplified in the aforesaid illustrative embodiments of the same, will readily occur to those skilled in the art to which the present invention relates.

What we claim as our invention is:

1. The method of preparing sugar sirups containing invert sugars, which comprises the steps of melting raw sugar, determining and controlling the hydrogen ion concentration of the melt so formed so that the same will have a predetermined degree of acidity and thereafter transporting said melt of predetermined acidity to a predetermined destination in said acid condition for a period of time sufficient to produce a determinable amount of invert sugars by the process of invertion while determining and controlling the mean temperature of the melt during such period of time to determine and control the proportion of invert sugars so formed.

2. The method of preparing sugar sirups containing invert sugars, which comprises the steps of melting raw sugar, determining and controlling the hydrogen ion concentration of the melt so formed so that the same will have a predetermined degree of acidity and thereafter transporting said melt of predetermined acidity to a predetermined destination in said acid condition for a period of time sufficient to produce a determinable amount of invert sugars by the process of invertion.

3. The method of preparing sugar sirups containing invert sugars, which comprises the steps of washing and thereafter melting raw sugar, determining and controlling the hydrogen ion concentration of the melt so formed so that the same will have a predetermined degree of acidity and thereafter transporting said melt of predetermined acidity to a predetermined destination in said acid condition for a period of time sufficient to produce a determinable amount of invert sugars by the process of inversion while determining and controlling the mean temperature of the melt during such period of time to determine and control the proportion of invert sugars so formed.

4. The method of preparing sugar sirups containing invert sugars, which comprises the steps of washing and thereafter melting raw sugar, determining and controlling the hydrogen ion concentration of the melt so formed so that the same will have a predetermined degree of acidity and thereafter transporting said melt of predetermined acidity to a predetermined destination in said acid condition for a period of time sufficient to produce a determinable amount of invert sugars by the process of inversion.

5. The method of preparing sugar sirups containing invert sugars, which comprises the steps of washing and thereafter melting raw sugar, determining and controlling the hydrogen ion concentration of the melt so formed so that the same will have a predetermined degree of acidity and thereafter transporting said melt of predetermined acidity to a predetermined destination in said acid condition an approximately predetermined distance corresponding to an approximately predetermined period of time sufficient to produce a determinable amount of invert sugars by the process of inversion while determining and controlling the mean temperature of the melt during such period of time to determine and control the proportion of invert sugars so formed.

6. The method of preparing sugar sirups containing invert sugars, which comprises the steps of melting raw sugar, determining and controlling the hydrogen ion concentration of the melt so formed so that the same will have a predetermined degree of acidity and thereafter transporting said melt of predetermined acidity to a predetermined destination in said acid condition an approximately predetermined distance corresponding to an approximately predetermined period of time sufficient to produce a determinable amount of invert sugars by the process of inversion while determining and controlling the mean temperature of the melt during such period of time to determine and control the proportion of invert sugars so formed.

7. The method of preparing sugar sirups containing invert sugars, which comprises the steps of washing and thereafter melting raw sugar, determining and controlling the hydrogen ion concentration of the melt so formed so that the same will have a predetermined degree of acidity and thereafter transporting said melt of predetermined acidity to a predetermined destination in said acid condition an approximately predetermined distance corresponding to an approximately predetermined period of time sufficient to produce a determinable amount of invert sugars by the process of inversion.

8. The method of preparing sugar sirups containing invert sugars, which comprises the steps of melting raw sugar, determining and controlling the hydrogen ion concentration of the melt so formed so that the same will have a predetermined degree of acidity, transporting said melt of predetermined acidity to a predetermined destination in said acid condition for a period of time sufficient to produce a determinable amount of invert sugars by the process of inversion, and thereafter subjecting the sirup so produced to a purifying treatment to clarify and lighten the color of the same.

In testimony whereof, we have signed our names to this specification this 20th day of June, 1929.

DANIEL V. WADSWORTH.
LEONARD WICKENDEN.